United States Patent
Okada

(10) Patent No.: US 9,628,143 B2
(45) Date of Patent: Apr. 18, 2017

(54) WAVEGUIDE, WAVEGUIDE MANUFACTURING METHOD, AND WIRELESS TRANSMISSION SYSTEM

(71) Applicant: SONY CORPORATION, Tokyo (JP)

(72) Inventor: Yasuhiro Okada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/779,403

(22) PCT Filed: Mar. 12, 2014

(86) PCT No.: PCT/JP2014/056543
§ 371 (c)(1),
(2) Date: Sep. 23, 2015

(87) PCT Pub. No.: WO2014/162833
PCT Pub. Date: Oct. 9, 2014

(65) Prior Publication Data
US 2016/0056860 A1 Feb. 25, 2016

(30) Foreign Application Priority Data
Apr. 3, 2013 (JP) ................. 2013-077397

(51) Int. Cl.
| | | |
|---|---|---|
| H04B 3/52 | (2006.01) | |
| H01P 3/16 | (2006.01) | |
| H01P 11/00 | (2006.01) | |
| H01P 3/127 | (2006.01) | |
| H01P 3/14 | (2006.01) | |

(52) U.S. Cl.
CPC ............ *H04B 3/52* (2013.01); *H01P 3/127* (2013.01); *H01P 3/14* (2013.01); *H01P 3/16* (2013.01); *H01P 3/165* (2013.01); *H01P 11/006* (2013.01)

(58) Field of Classification Search
CPC ... H04B 3/52; H01P 3/127; H01P 3/14; H01P 3/16
See application file for complete search history.

(56) References Cited

U.S. PATENT DOCUMENTS

| | | | | |
|---|---|---|---|---|
| 6,185,155 B1* | 2/2001 | Steinich | ................ | G01B 17/00 367/140 |
| 2005/0265677 A1* | 12/2005 | Hongo | .................. | G02B 6/032 385/123 |
| 2007/0171007 A1* | 7/2007 | Mahlandt | ................ | H01P 3/127 333/239 |

FOREIGN PATENT DOCUMENTS

| | | |
|---|---|---|
| JP | 08-195605 A | 7/1996 |
| JP | 11-136009 A | 5/1999 |
| JP | 2010-252092 A | 11/2010 |

OTHER PUBLICATIONS

International Search Report prepared by the Japanese Patent Office on May 29, 2014, for International Application No. PCT/JP2014/056543.

* cited by examiner

*Primary Examiner* — Jaison Joseph
(74) *Attorney, Agent, or Firm* — Sheridan Ross P.C.

(57) ABSTRACT

A waveguide includes: a dielectric including two surfaces, an electric field intersecting with the two surfaces; metal-plating layers coating the two surfaces of the dielectric, the electric field intersecting with the two surfaces; and a protective layer coating a periphery of the dielectric including the two surfaces coated with the metal-plating layers. A wireless transmission system includes: a sender configured to send a high-frequency signal; and a receiver configured to receive the high-frequency signal. The waveguide is used as a waveguide configured to transmit the high-frequency signal between the sender and the receiver in the wireless transmission system.

17 Claims, 5 Drawing Sheets

(Modified example 1)　(Modified example 2)　(Modified example 3)

(Step 1)

(Step 2)

(Step 3)

WAVEGUIDE, WAVEGUIDE MANUFACTURING METHOD, AND WIRELESS TRANSMISSION SYSTEM

CROSS REFERENCE TO RELATED APPLICATIONS

This application is a national stage application under 35 U.S.C. 371 and claims the benefit of PCT Application No. PCT/JP2014/056543 having an international filing date of Mar. 12, 2014, which designated the United States, which PCT application claimed the benefit of Japanese Patent Application No. 2013-077397 filed Apr. 3, 2013, the disclosures of which are incorporated herein by reference in their entirety.

TECHNICAL FIELD

The present disclosure relates to a waveguide, a waveguide manufacturing method, and a wireless transmission system.

BACKGROUND ART

Examples of a waveguide configured to transmit electromagnetic waves, i.e., particularly high-frequency signals such as microwaves, millimeter waves, or terahertz waves, include a hollow waveguide and a dielectric waveguide. Flexibility of a dielectric waveguide is better than flexibility of a hollow waveguide. As such a dielectric waveguide, there is known one having a structure in which a metal tape is helically wound up around the surface of a dielectric stick in order to increase flexibility without lowering transmission efficiency (for example, see Patent Document 1).

Patent Document 1: Japanese Patent Application Laid-open No. H08-195605

SUMMARY OF INVENTION

Problem to be Solved by the Invention

However, according to the related art described in Patent Document 1, it is difficult to coat the periphery of the dielectric with a metal conductor tightly, and in addition, spaces are generated between the dielectric and the metal conductor when the waveguide is bent. If spaces are generated between the dielectric and the metal conductor, transmission property of the dielectric waveguide is lowered. Further, Patent Document 1 also describes a technical matter in which a metal-plating layer is provided on an outer periphery of the dielectric stick having a rectangular cross-section, as shown in FIG. 5 thereof. However, if a conductor around the dielectric is merely a metal-plating layer, the metal-plating layer is cracked easily when the dielectric waveguide is bent. In other words, the dielectric waveguide, which is obtained by simply coating the periphery of the dielectric with the metal-plating layer, is vulnerable to deformation such as bend.

In view of the above, it is an object of the present invention to provide a waveguide resistant to deformation such as bend, a method of manufacturing the waveguide, and a wireless transmission system using the waveguide.

Means for Solving the Problem

In order to achieve the above-mentioned object, according to the present disclosure, there is provided a waveguide, including:

a dielectric including two surfaces, an electric field intersecting with the two surfaces;

metal-plating layers coating the two surfaces of the dielectric, the electric field intersecting with the two surfaces; and a protective layer coating a periphery of the dielectric including the two surfaces coated with the metal-plating layers.

In order to achieve the above-mentioned object, according to the present disclosure, there is provided a waveguide manufacturing method, including:

the step of metal-plating two surfaces of a dielectric, an electric field intersecting with the two surfaces; and the step of coating a periphery of the dielectric including the two metal-plated surfaces with a protective layer, in this order.

In order to achieve the above-mentioned object, according to the present disclosure, there is provided a wireless transmission system, including:

a sender configured to send a high-frequency signal;

a receiver configured to receive the high-frequency signal; and a waveguide configured to transmit the high-frequency signal between the sender and the receiver, in which the waveguide includes a dielectric including two surfaces, an electric field intersecting with the two surfaces, metal-plating layers coating the two surfaces of the dielectric, the electric field intersecting with the two surfaces, and a protective layer coating a periphery of the dielectric including the two surfaces coated with the metal-plating layers.

In the waveguide (dielectric waveguide) using a dielectric, the two surfaces of the dielectric, with which the electric field intersects, are metal-plated. As a result, adhesiveness between the two surfaces of the dielectric and the metal is improved. In other words, it is possible to coat the two surfaces with metal tightly. Further, because the protective layer coats a periphery of the dielectric including the two surfaces coated with the metal-plating layers, it is possible to prevent the metal-plating layers from being cracked when the dielectric waveguide is bent. In this way, it is possible to realize the dielectric waveguide whose structure is resistant to deformation such as bend.

Effect of the Invention

According to the present disclosure, it is possible to realize the dielectric waveguide whose structure is resistant to deformation such as bend.

Note that the effects described in the specification are merely examples, effects are not limited to them, and additional effects may be obtained.

MODES FOR CARRYING OUT THE INVENTION

Figure 1A:
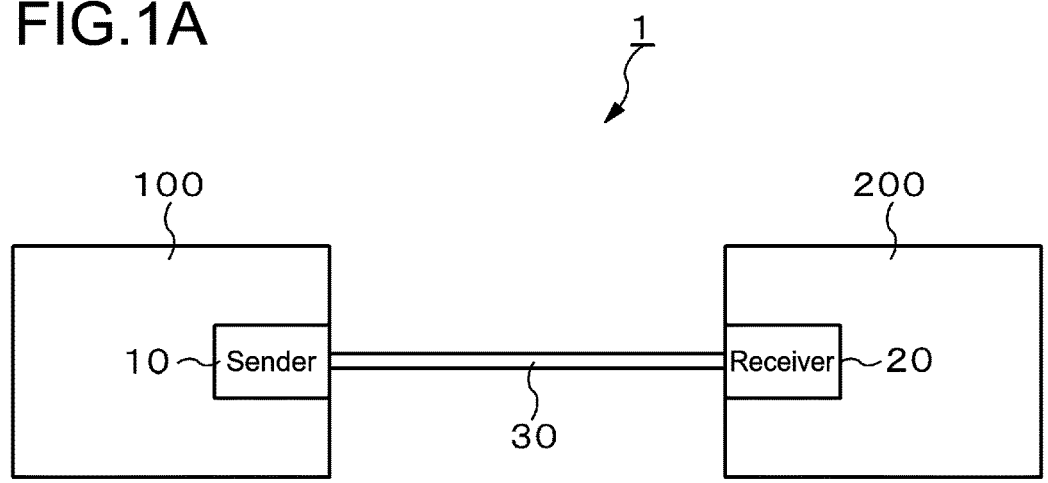
FIG. 1A is a block diagram showing an example of the structure of a wireless transmission system to which the technology of the present disclosure is applicable.

Hereinafter, an embodiment of the technology of the present disclosure (hereinafter referred to as "embodiment") will be described in detail with reference to the drawings. The present disclosure is not limited to the embodiment, and various numerical values, materials, and the like of the embodiment are examples. In the following description, the same elements or elements having the same function will be denoted by the same reference symbols, and duplicated description will be omitted. Note that description will be given in the following order.
1. General description of a waveguide, a waveguide manufacturing method, and a wireless transmission system of the present disclosure
2. Wireless transmission system to which the technology of the present disclosure is applicable
3. Waveguide according to the embodiment
   3-1. Structure of dielectric waveguide
   3-2. Modified examples of the cross-sectional shape of a dielectric
   3-3. Dielectric waveguide manufacturing method
4. Structure of the present disclosure
   <General Description of a Waveguide, a Waveguide Manufacturing Method, and a Wireless Transmission System of the Present Disclosure>

A wireless transmission system, which is configured to transmit electromagnetic waves, i.e., particularly high-frequency signals such as microwaves, millimeter waves, or terahertz waves, via a waveguide as a medium, is preferably used to transmit signals between various kinds of apparatuses such as electronic apparatuses, information processing apparatuses, and semiconductor apparatuses, and to transmit signals between circuit boards of a single apparatus. In the wireless transmission system, a waveguide, which is configured to transmit high-frequency signals, is sometimes referred to as a waveguide cable, because it functions as a cable connecting apparatuses or circuit boards.

For example, millimeter waves of high-frequency waves are radio waves whose frequency is 30 [GHz] to 300 [GHz] (wavelength is 1 [mm] to 10 [mm]). If millimeter-waveband signals are transmitted, it is possible to transmit signals at higher speed of Gbps order (for example, 5 [Gbps] or more). For example, examples of signals, which are required to be transmitted at higher speed of Gbps order, include data signal of cinema videos, computer images, and the like. Further, to transmit millimeter-waveband signals is excellent in interference immunity, and does not adversely affect other electric wiring in cable connection between apparatuses, which are advantages.

In the wireless transmission system configured to transmit for example millimeter-waveband signals of high-frequency signals, a waveguide may be a hollow waveguide or a dielectric waveguide. It is desirable to use a dielectric waveguide, which is better in flexibility than a hollow waveguide. In a dielectric waveguide, electromagnetic waves form an electromagnetic field depending on a wavelength (frequency) or the like, and propagate in the dielectric at the same time.

A waveguide of the present disclosure includes: a dielectric including two surfaces, an electric field intersecting with the two surfaces; metal-plating layers coating the two surfaces of the dielectric, the electric field intersecting with the two surfaces; and a protective layer coating a periphery of the dielectric including the two surfaces coated with the metal-plating layers. In the waveguide, i.e., the dielectric waveguide, the protective layer may include a sheet-like conductor wound up around the dielectric including the two surfaces coated with the metal-plating layers. In this case, the sheet-like conductor is a metal tape, desirably.

According to the waveguide of the present disclosure having the above-mentioned preferable structure, the waveguide manufacturing method, and the wireless transmission system, the metal-plating layers and the metal tape may be made of the same metal material. Alternatively, the metal-plating layers may be made of a metal material having a conductivity higher than a conductivity of the metal tape.

Further, according to the waveguide of the present disclosure having the above-mentioned preferable structure, the waveguide manufacturing method, and the wireless transmission system, a cross-sectional shape of the dielectric perpendicular to a waveguide direction may be a rectangle, and two surfaces including longer sides of the cross section may be the two surfaces, the electric field intersecting with the two surfaces. In this case, the rectangular cross-section of the dielectric may have arc-shaped corners, or the dielectric may have two arc-shaped surfaces including shorter sides of the rectangular cross-section. Here, the "waveguide direction" means the direction in which electromagnetic waves propagate in a dielectric.

Alternatively, according to the waveguide of the present disclosure having the above-mentioned preferable structure, the waveguide manufacturing method, and the wireless transmission system, a cross-sectional shape of the dielectric perpendicular to a waveguide direction may be an elliptical shape, and two surfaces of the cross-section having a larger curvature may be the two surfaces, the electric field intersecting with the two surfaces.

According to the present disclosure, a waveguide manufacturing method includes: the step of metal-plating two surfaces of a dielectric, an electric field intersecting with the two surfaces; and the step of coating a periphery of the dielectric including the two metal-plated surfaces with a protective layer, in this order. According to this manufacturing method, the dielectric may have a sheet-like shape, and the step of metal-plating may include metal-plating both surfaces of the sheet-like dielectric.

Further, the waveguide manufacturing method of the present disclosure including the above-mentioned preferable structure may include, in addition to the step of metal-plating and the step of coating with a protective layer, the step of cutting the sheet-like dielectric having both the metal-plated surfaces into strips each having a predetermined width. In this case, the step of coating with the protective layer may include winding up a sheet-like conductor around the dielectric, the dielectric being metal-plated and cut in a strip.

<Wireless Transmission System to which the Technology of the Present Disclosure is Applicable>

Figure 1B:
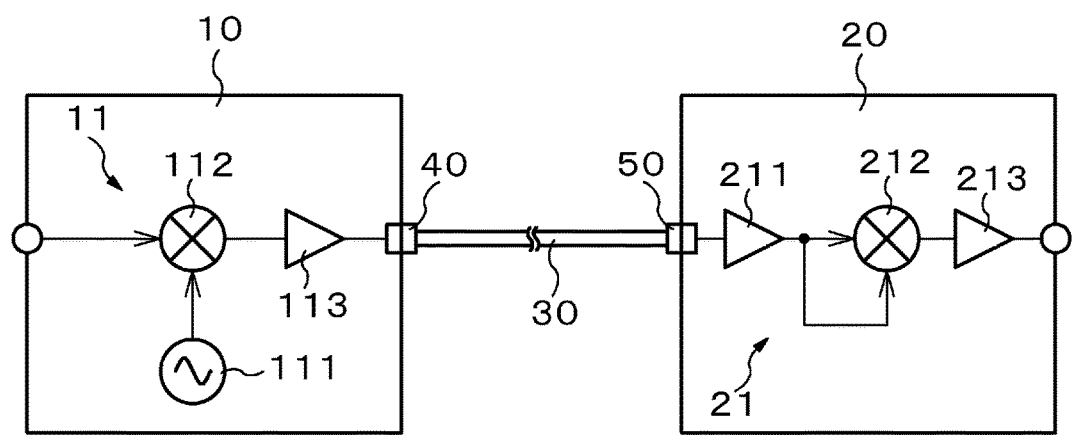
FIG. 1B is a block diagram showing an example of the specific structure of a sender and a receiver of the wireless transmission system.

With reference to FIG. 1A and FIG. 1B, an example of a wireless transmission system to which the technology of the present disclosure is applicable will be described. FIG. 1A is a block diagram showing an example of the structure of a wireless transmission system to which the technology of the present disclosure is applicable, and FIG. 1B is a block diagram showing an example of the specific structure of a sender and a receiver of the wireless transmission system.

As shown in FIGS. 1, the wireless transmission system 1 of this application example includes the sender 10 configured to send high-frequency signals, the receiver 20 configured to receive the high-frequency signals, and the dielectric waveguide (dielectric waveguide cable) 30 configured to transmit the high-frequency signals between the sender 10 and the receiver 20.

In the following example, a wireless transmission system, which is configured to transmit for example millimeter-waveband signals of high-frequency signals by using a dielectric waveguide, will be described.

By the way, millimeter-waveband signals (millimeter-wave communication) being high-frequency signals are advantageous as follows.
a) Because the communication band of the millimeter-wave communication is wider, it is easy to make the data rate higher.
b) It is possible to remove the frequency used for transmission from the other frequency of baseband signal processing, and therefore the frequency of millimeter waves rarely interfere with the frequency of baseband signals.
c) Because the wavelength of millimeter wavebands is small, it is possible to make the waveguide structure, which depends on a wavelength, smaller. In addition, because distance decay is larger and diffraction is smaller, it is easy to shield electromagnetic fields.
d) In general wireless communication, stability of carrier waves is strictly regulated in order to prevent interference and the like from occurring. In order to realize such carrier waves high in stability, external frequency reference components, multiplier circuits, PLLs (phase lock loop circuits), and the like higher in stability are used, and the circuit is made larger in size. To the contrary, in millimeter-wave communication, it is possible to prevent leakage to outside from occurring easily and in addition to use carrier waves lower in stability for transmission, and it is therefore possible to prevent the size of the circuit from being increased.

In the wireless transmission system 1 of this application example configured to transmit millimeter-wave signals, the sender 10 is configured to convert signals-to-be-transmitted into millimeter-wave signals, and to output the millimeter-wave signals to the dielectric waveguide 30. The receiver 20 is configured to receive the millimeter-wave signals transmitted through the dielectric waveguide 30, and to restore (decode) the millimeter-wave signals to the original signals-to-be-transmitted.

In this application example, the first communication apparatus 100 includes the sender, and the second communication apparatus 200 includes the receiver 20. In this case, the dielectric waveguide 30 transmits high-frequency signals between the first communication apparatus 100 and the second communication apparatus 200, in other words. The communication apparatuses 100, 200 configured to send/receive signals via the dielectric waveguide 30 include the sender 10 and the receiver 20 in a pair, respectively. The signal transmission method between the first communication apparatus 100 and the second communication apparatus 200 may be a unidirectional (one-way) transmission method or a bidirectional transmission method.

The sender 10 (the first communication apparatus 100) and the receiver 20 (the second communication apparatus 200) are arranged in a predetermined area. Here, because high-frequency signals are millimeter-wave signals, it is only necessary that the "predetermined area" is determined as long as a millimeter-wave transmittable area can be restricted. Typically, the distance of the "predetermined area" is smaller than distances between communication apparatuses used for broadcasting and general wireless communication.

Examples of arrangement of the sender 10 and the receiver 20 in the predetermined area include arrangement in separate communication apparatuses (electronic apparatuses), i.e., the first communication apparatus 100 and the second communication apparatus 200, as shown in FIG. 1A, and in addition the following arrangement. For example, it is conceivable that the sender 10 and the receiver 20 are arranged on separate circuit boards of one electronic apparatus. In this arrangement, one circuit board corresponds to the first communication apparatus 100, and the other circuit board corresponds to the second communication apparatus 200.

Alternatively, it is conceivable that the sender 10 and the receiver 20 are arranged on separate semiconductor chips of one electronic apparatus. In this example, one semiconductor chip corresponds to the first communication apparatus 100, and the other semiconductor chip corresponds to the second communication apparatus 200. Further, it is conceivable that the sender 10 and the receiver 20 are arranged on separate circuit parts of one circuit board, respectively. In this example, one circuit part corresponds to the first communication apparatus 100, and the other circuit part corresponds to the second communication apparatus 200. It should be noted that the arrangement is not limited to the above-mentioned examples.

Meanwhile, it is conceivable that examples of the pair of the first communication apparatus 100 and the second communication apparatus 200 are as follows. It should be noted that the following pairs are merely examples and are not limited to them.

According to a conceivable pair, if the second communication apparatus 200 is a battery-powered apparatus such as a mobile phone, a digital camera, a video camera, a game machine, or a remote control, the first communication apparatus 100 is a so-called base station configured to charge its battery and to process images. According to another conceivable pair, if the second communication apparatus 200 has a relatively-thin appearance such as an electronic card, the first communication apparatus 100 is a card reader/writer apparatus therefor. Further, the card reader/writer apparatus is used with, for example, a main electronic apparatus such as a digital recorder/reproducer, a terrestrial television receiver, a mobile phone, a game machine, or a computer in combination. Further, if they are applicable to an image-pickup apparatus, for example, the first communication apparatus 100 is at the main board side and the second communication apparatus 200 is at the image-pickup board side, and they transmit signals in one apparatus (device).

Next, with reference to FIG. 1B, a specific structural example of the sender 10 and the receiver 20 will be described.

The sender 10 includes, for example, the signal generator 11 configured to process signals-to-be-transmitted and to generate millimeter-wave signals. The signal generator 11 is a signal converter configured to convert signals-to-be-transmitted to millimeter-wave signals, and includes, for example, an ASK (Amplitude Shift Keying) modulation circuit. Specifically, the signal generator 11 is configured to multiply, by the multiplier 112, millimeter-wave signals from the oscillator 111 by signals-to-be-transmitted, to thereby generate ASK modulation waves being millimeter waves, and to output the obtained waves via the buffer 113. The connector apparatus 40 is interposed between the sender 10 and the dielectric waveguide 30. The connector apparatus 40 couples the sender 10 to the dielectric waveguide 30 by, for example, capacitive coupling, electromagnetic induction coupling, electromagnetic field coupling, resonator coupling, and the like.

Meanwhile, the receiver 20 includes, for example, the signal decoder 21 configured to process millimeter-wave signals from the dielectric waveguide 30, to decode the millimeter-wave signals, and to thereby obtain original signals-to-be-transmitted. The signal decoder 21 is a signal converter configured to convert the received millimeter-wave signals into the original signal-to-be-transmitted, and includes, for example, a square-law (squaring) detector circuit. Specifically, the signal decoder 21 is configured to square, by the multiplier 212, millimeter-wave signals (ASK modulation waves) from the buffer 211, to thereby convert the millimeter-wave signals into original signals-to-be-transmitted, and to output the original signals-to-be-transmitted via the buffer 213. The connector apparatus 50 is interposed between the dielectric waveguide 30 and the receiver 20. The connector apparatus 50 couples the dielectric waveguide 30 to the receiver 20 by, for example, capacitive coupling, electromagnetic induction coupling, electromagnetic field coupling, resonator coupling, and the like.

The dielectric waveguide 30 has a waveguide structure configured to confine millimeter waves in the dielectric and to transmit the millimeter waves at the same time, and is capable of transmitting millimeter-waveband electromagnetic waves efficiently. For example, preferably, the dielectric waveguide 30 includes a dielectric material having a relative permittability of a predetermined range and a dielectric tangent of a predetermined range.

Here, with regard to the "predetermined range", it is only necessary that a relative permittability or a dielectric tangent of a dielectric material has a range, with which desirable effects may be attained, and it is only necessary that the range is determined as long as desirable effects are attained. It should be noted that the property of the dielectric waveguide 30 is determined based on not only a dielectric material itself but also the length of a transmission path and the frequency (wavelength) of millimeter waves. In this way, a relative permittability or a dielectric tangent of a dielectric material is not necessarily determined specifically, but, for example, may be determined as follows.

In order to transmit millimeter-wave signals in the dielectric waveguide 30 at higher speed, desirably, a relative permittability of a dielectric material is about 2 to 10 (desirably, 3 to 6), and its dielectric tangent is about 0.00001 to 0.01 (desirably, 0.00001 to 0.001). Examples of dielectric materials satisfying such conditions include, for example, dielectric materials made of acrylic resin, urethane resin, epoxy resin, silicone, polyimide, and cyanoacrylate resin.

<Waveguide According to the Embodiment>

The wireless transmission system 1 structured as described above includes, as the dielectric waveguide (dielectric waveguide cable) 30 configured to transmit high-frequency signals between the sender 10 and the receiver 20, a dielectric waveguide according to the embodiment of the present disclosure described below. Further, a wireless transmission system including the dielectric waveguide of this embodiment as the dielectric waveguide 30 is a wireless transmission system of the present disclosure.

[Structure of Dielectric Waveguide]

Figure 2A:
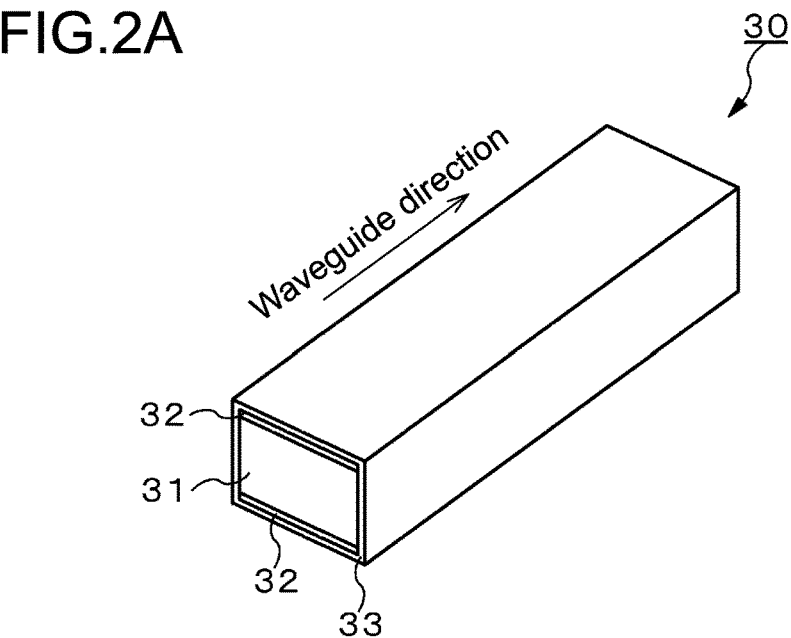
FIG. 2A is a perspective view schematically showing the dielectric waveguide of the embodiment of the present disclosure.
Figure 2B:
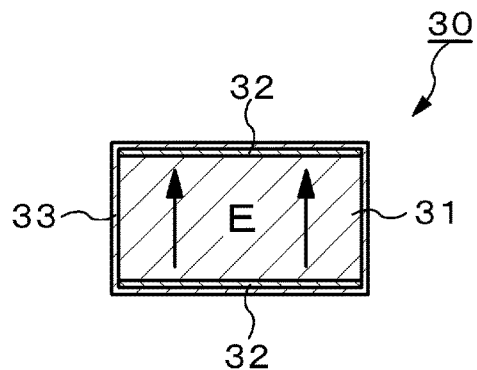
FIG. 2B is a cross-sectional view showing the cross-sectional structure of the dielectric waveguide of the embodiment of the present disclosure perpendicular to the waveguide direction, and FIG. 2C includes cross-sectional views showing modified examples of the cross-sectional shape of the dielectric (dielectric material).

FIG. 2A is a perspective view schematically showing the dielectric waveguide of the embodiment of the present disclosure, and FIG. 2B is a cross-sectional view showing the cross-sectional structure of the dielectric waveguide of the embodiment of the present disclosure perpendicular to the waveguide direction. Here, the "waveguide direction" means the direction in which electromagnetic waves propagate in a dielectric.

As shown in FIG. 2A and FIG. 2B, the dielectric (dielectric material) 31 of the dielectric waveguide 30 has a rectangular cross-sectional shape perpendicular to the waveguide direction, and includes two surfaces, with which the electric field E shown by the arrows in the figure intersects (for example, perpendicularly) when electromagnetic waves propagate in the dielectric 31, and two surfaces in parallel with the electric field E. Further, the two surfaces, with which the electric field E intersects, are two opposite surfaces including longer sides of the cross-section, and the two surfaces in parallel with the electric field E are two opposite surfaces including shorter sides of the cross-section.

The dielectric waveguide 30 of this embodiment includes, in addition to the dielectric (dielectric material) 31, the metal-plating layers 32 coating the two surfaces of the dielectric 31, with which the electric field E intersects, and the protective layer 33 coating the periphery of the dielectric 31 including the two surfaces coated with the metal-plating layers 32. Examples of a metal material forming the metal-plating layers 32 include gold, aluminum, copper, and the like. It should be noted that a metal material is not limited to them.

The protective layer 33 is a sheet-like conductor, for example, helically wound up around the dielectric 31 including the two surfaces coated with the metal-plating layers 32. An example of the sheet-like conductor is a metal tape, for example. It should be noted that this is merely an example, and it is not limited to a metal tape. The metal material of the metal tape may be the same as the metal material of the metal-plating layers 32, or may be different from the metal material of the metal-plating layers 32. Note that, from a viewpoint of conductivity, preferably, the conductivity of the metal material of the metal-plating layers 32 is higher than that of the metal tape forming the protective layer 33.

[Modified Examples of Cross-Sectional Shape of Dielectric]

Figure 2C:
Figure 2C:
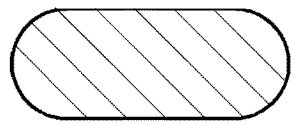
Figure 2C:
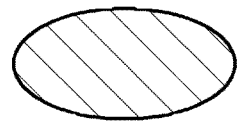

FIG. 2C includes cross-sectional views showing modified examples of the cross-sectional shape of the dielectric (dielectric material). Examples of the cross-sectional shape of the dielectric 31 perpendicular to the waveguide direction may include, in addition to a rectangular shape, a cross-sectional shape (modified example 1) having arc-shaped corners of a rectangular cross-section, and a cross-sectional shape (modified example 2) having two arc-shaped shorter sides (surfaces) of a rectangular cross-section. Alternatively, the cross-sectional shape of the dielectric 31 perpendicular to the waveguide direction may be an elliptical shape (modified example 3). If the cross-sectional shape is an elliptical shape, two surfaces having the larger curvature of the cross-section are two surfaces, with which the electric field E intersects.

As described above, in the dielectric waveguide 30 of this embodiment, the metal-plating layers 32 coat the two surfaces of the dielectric 31, with which the electric field E intersects, i.e., the two surfaces including the longer sides. In other words, the two surfaces including the longer sides are metal-plated. Since they are metal-plated, adhesiveness between the two surfaces including the longer side of the dielectric 31 and the metal (the metal-plating layers 32) is improved. In other words, it is possible to coat the two surfaces including the longer side of the dielectric 31 with metal tightly. As a result, even if the dielectric waveguide 30 is bent, no space is generated between the two surfaces including the longer sides and the metal, and the transmission property of the dielectric waveguide 30 may thus be improved. By the way, spaces generated on the two surfaces including the shorter sides, do not affect the transmission property much.

Figure 3A:
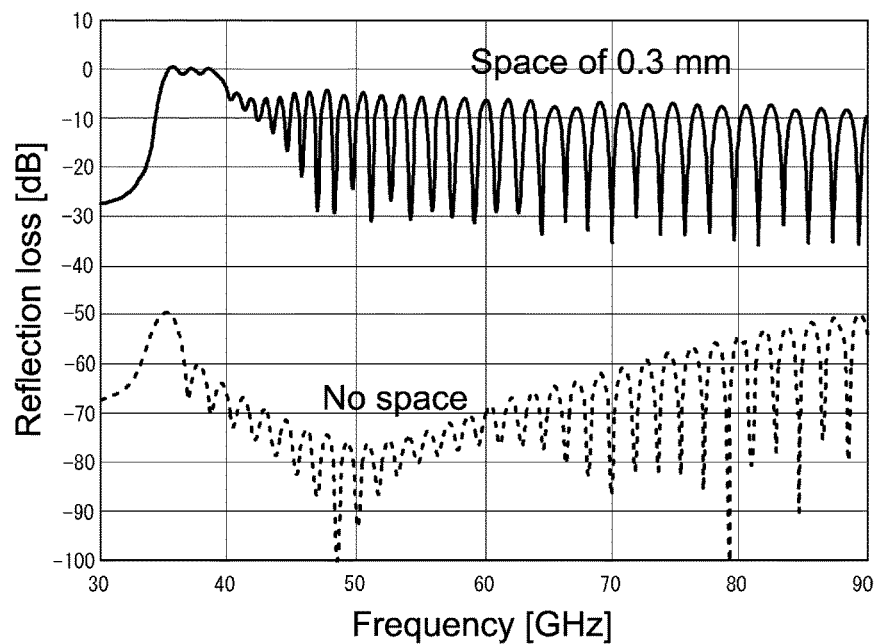
FIG. 3A shows a simulation result of a reflection loss [dB] and FIG. 3B shows a simulation result of a transmission loss [dB] when spaces are generated on the two surfaces including the longer sides of the dielectric.
Figure 3B:
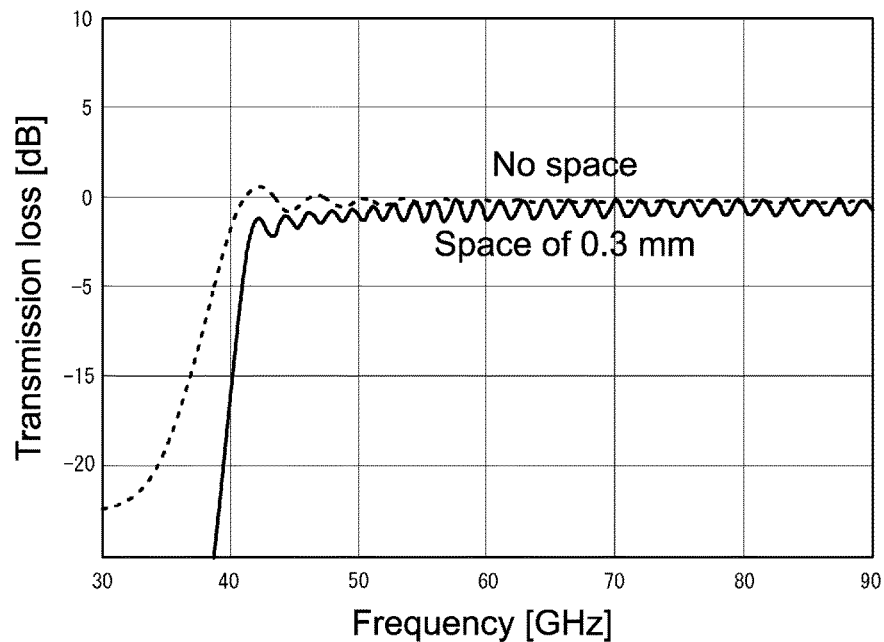
Figure 4A:
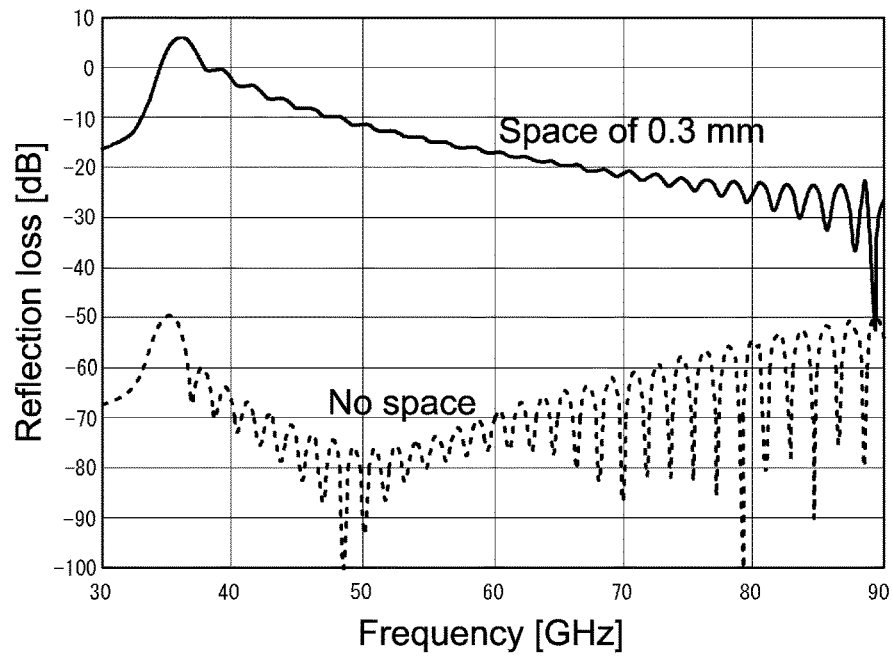
FIG. 4A shows a simulation result of a reflection loss [dB] and FIG. 4B shows a simulation result of a transmission loss [dB] when spaces are generated on the two surfaces including the shorter sides of the dielectric.
Figure 4B:
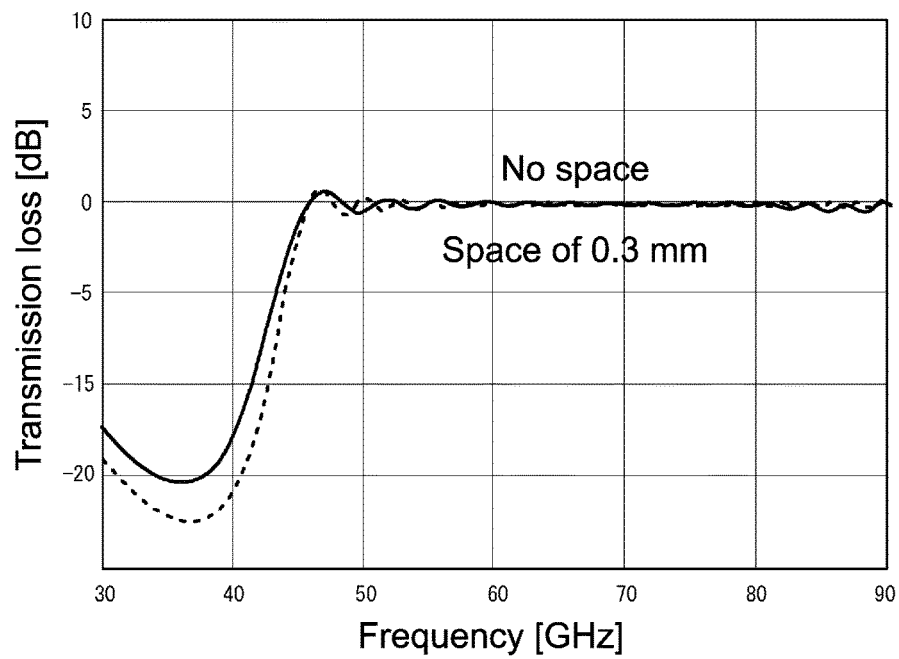

Here, simulation results when spaces are generated on the two surfaces including the longer side of the dielectric 31 are compared with simulation results when spaces are generated on the two surfaces including the shorter sides. FIG. 3A shows a simulation result of a reflection loss [dB] and FIG. 3B shows a simulation result of a transmission loss [dB] when spaces are generated on the two surfaces including the longer sides of the dielectric 31. Further, FIG. 4A shows a simulation result of a reflection loss [dB] and FIG. 4B shows a simulation result of a transmission loss [dB] when spaces are generated on the two surfaces including the shorter sides of the dielectric 31.

Those simulation results are under the following conditions. In the condition, the material of the dielectric 31 is PTFE (polytetrafluoroethylene: tetrafluoroethylene resin) whose relative permittability is 2.1 and dielectric tangent is 0.0002, and the size of the dielectric 31 is 3 [mm] in width and 1.5 [mm] in height. Further, the material of external conductors such as the metal-plating layers 32 is copper whose thickness is 0.1 [mm], and the length of the dielectric waveguide 30 is 5 [cm]. Further, spaces of 0.3 [mm] are generated on the two surfaces including the longer sides or the two surfaces including the shorter sides.

As apparent from FIG. 3A, the reflection loss [dB] when spaces are generated on the two surfaces including the longer side of the dielectric 31 is larger than that without spaces. As apparent from FIG. 3B, the transmission loss [dB] and the number of ripples when spaces are generated on the two surfaces including the longer side of the dielectric 31 are larger than those without spaces. Meanwhile, as apparent from comparison between FIGS. 3A and 3B and FIGS. 4A and 4B, influences on a reflection loss [dB] and a transmission loss [dB] when spaces are generated on the two surfaces including the shorter sides of the dielectric 31 are smaller than those when spaces are generated on the two surfaces including the longer sides.

As apparent from the above-mentioned simulation results, it is important that spaces be not generated between the two surfaces including the longer side of the dielectric 31 and the metal, i.e., excellent adhesiveness is important. In this way, the two surfaces including the longer sides of the dielectric 31 are metal-plated to prevent spaces from being generated between the two surfaces including the longer sides and the metal, and the transmission property of the dielectric waveguide 30 may thus be improved. Further, the material costs and the number of steps may be less than those of the dielectric 31, which includes four surfaces including the longer sides and the shorter sides metal-plated. As a result, the cost of the dielectric waveguide 30 is reduced, which is advantages.

Further, because the protective layer 33 coats the periphery of the dielectric 31 including the two metal-plated surfaces including the longer sides, it is possible to prevent the metal-plating layers 32 from being cracked from the effect of the protective layer 33 when the dielectric waveguide 30 is bent. In this way, it is possible to realize the dielectric waveguide 30 whose structure is resistant to deformation such as bend.

[Dielectric Waveguide Manufacturing Method]

Next, with reference to a process diagram of FIG. 5, an example of a method of manufacturing the dielectric waveguide of the present disclosure, i.e., a method of manufacturing the dielectric waveguide 30 structured as described above, will be described.

Figure 5:
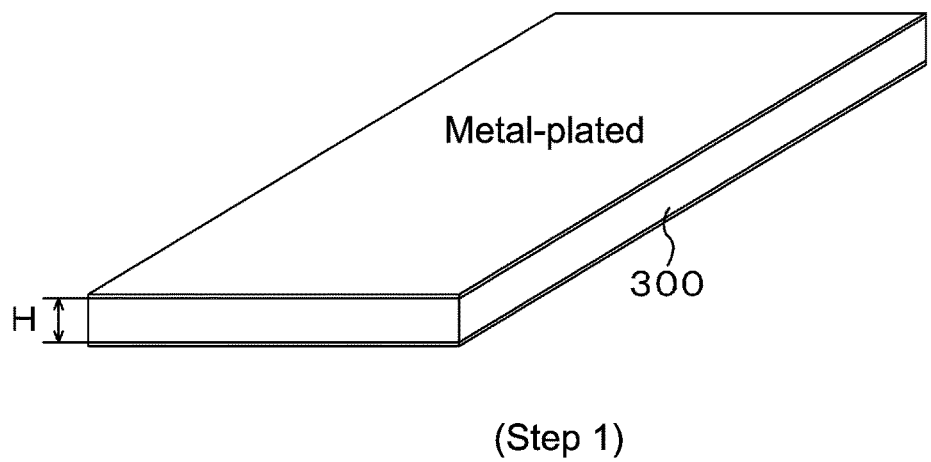
FIG. 5 is a process diagram showing the steps of the dielectric waveguide manufacturing method of the present disclosure.
Figure 5:
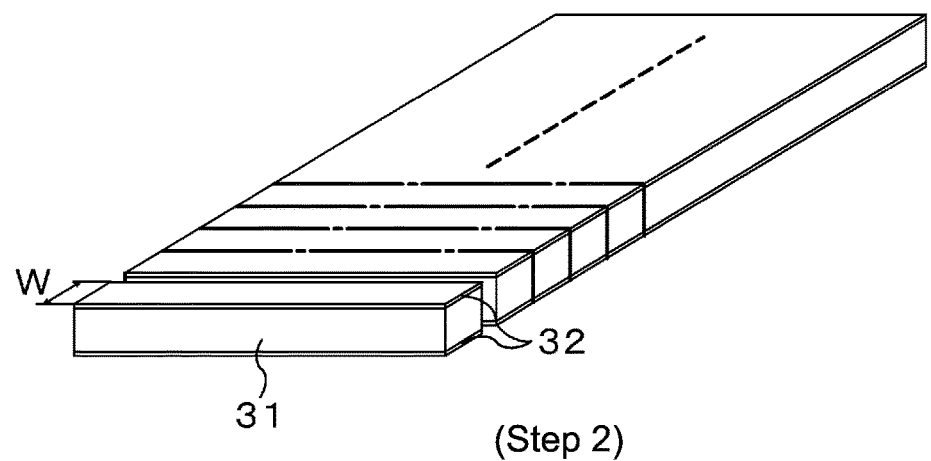
Figure 5:
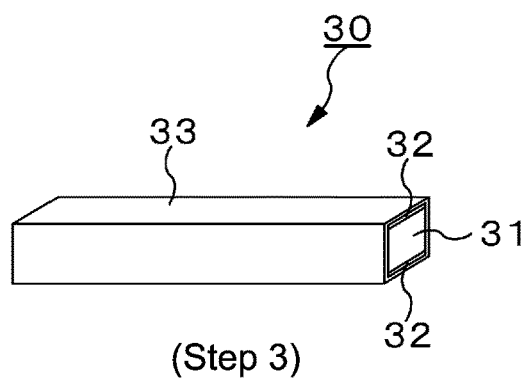

First, the sheet-like dielectric material (dielectric) 300 whose thickness is H is prepared, and both the surfaces of the dielectric material 300 are metal-plated with a metal material such as gold, aluminum, or copper (step 1 of FIG. 5). Next, the metal-plated sheet-like dielectric material 300 is cut, and strips each having a predetermined width W are obtained (step 2 of FIG. 5). Finally, a sheet-like conductor, e.g., a metal tape, is for example helically wound up around the cut dielectric 31, which includes two metal-plated surfaces and has a strip shape. As a result, the periphery of the dielectric 31 including the two metal-plated surfaces are coated with the conductor sheet (step 3 of FIG. 5).

According to the above-mentioned manufacturing method, in which the step 1 to step 3 are processed in this order, it is possible to manufacture the dielectric waveguide 30, in which the two surfaces of the dielectric 31 whose width is W and height is H are coated with the metal-plating layers 32, and the periphery of the dielectric 31 including the two surfaces is coated with the protective layer 33. According to this manufacturing method, because it is only necessary to plate the two surfaces of the dielectric 31 with metal, the material costs and the number of steps may be less than those of a dielectric including metal-plated four surfaces. As a result, the cost of the dielectric waveguide 30 may be reduced. In addition, it is only necessary to cut the metal-plated sheet-like dielectric material 300 in strips, which is excellent in mass-productivity.

According to this manufacturing method, both the surfaces of the sheet-like dielectric material 300 are metal-plated, and thereafter the sheet-like dielectric material 300 is cut in strips. Alternatively, in principle, two surfaces of a dielectric material whose width is W and height is H may only have to be metal-plated.

Note that according to the above-mentioned embodiment, as the dielectric waveguide of the present disclosure, a waveguide having a rectangular cross-sectional shape perpendicular to the waveguide direction and a waveguide having an elliptical cross-sectional shape are described as examples. However, the dielectric waveguide of the present disclosure is not limited to one of them, and may be a ridge waveguide including ridges on the inner side of the waveguide in the waveguide direction (longitudinal direction).

<Structure of the Present Disclosure>

Note that the present disclosure may employ the following structures.

[1] A waveguide, including:

a dielectric including two surfaces, an electric field intersecting with the two surfaces;

metal-plating layers coating the two surfaces of the dielectric, the electric field intersecting with the two surfaces; and a protective layer coating a periphery of the dielectric including the two surfaces coated with the metal-plating layers.

[2] The waveguide according to [1], in which
the protective layer includes a sheet-like conductor wound up around the dielectric including the two surfaces coated with the metal-plating layers.

[3] The waveguide according to [2], in which
the sheet-like conductor is a metal tape.

[4] The waveguide according to [3], in which
the metal-plating layers and the metal tape are made of the same metal material.

[5] The waveguide according to [3], in which
the metal-plating layers are made of a metal material having a conductivity higher than a conductivity of the metal tape.

[6] The waveguide according to any one of [1] to [5], in which
a cross-sectional shape of the dielectric perpendicular to a waveguide direction is a rectangle, and two surfaces including longer sides of the cross section are the two surfaces, the electric field intersecting with the two surfaces.

[7] The waveguide according to [6], in which
the rectangular cross-section of the dielectric has arc-shaped corners.

[8] The waveguide according to [6], in which
the dielectric has two arc-shaped surfaces including shorter sides of the rectangular cross-section.

[9] The waveguide according to any one of [1] to [5], in which
a cross-sectional shape of the dielectric perpendicular to a waveguide direction is an elliptical shape, and two surfaces of the cross-section having a larger curvature are the two surfaces, the electric field intersecting with the two surfaces.

[10] The waveguide according to any one of [1] to [9], in which
the waveguide is configured to transmit a high-frequency signal.

[11] The waveguide according to [10], in which the high-frequency signal is a millimeter-waveband signal.

[12] A waveguide manufacturing method, including:
the step of metal-plating two surfaces of a dielectric, an electric field intersecting with the two surfaces; and
the step of coating a periphery of the dielectric including the two metal-plated surfaces with a protective layer, in this order.

[13] The waveguide manufacturing method according to [12], in which
the dielectric has a sheet-like shape, and
the step of metal-plating includes metal-plating both surfaces of the sheet-like dielectric.

[14] The waveguide manufacturing method according to [13], further including:
the step of cutting the sheet-like dielectric having both the metal-plated surfaces into strips each having a predetermined width.

[15] The waveguide manufacturing method according to [14], in which
the step of coating with the protective layer includes winding up a sheet-like conductor around the dielectric, the dielectric being metal-plated and cut in a strip.

[16] The waveguide manufacturing method according to [15], in which
the sheet-like conductor is a metal tape.

[17] A wireless transmission system, including:
a sender configured to send a high-frequency signal;
a receiver configured to receive the high-frequency signal; and
a waveguide configured to transmit the high-frequency signal between the sender and the receiver], in which
the waveguide includes
a dielectric including two surfaces, an electric field intersecting with the two surfaces,
metal-plating layers coating the two surfaces of the dielectric, the electric field intersecting with the two surfaces, and
a protective layer coating a periphery of the dielectric including the two surfaces coated with the metal-plating layers.

[18] The wireless transmission system according to [17], in which
the high-frequency signal is a millimeter-waveband signal.

DESCRIPTION OF REFERENCE NUMERALS 1 wireless transmission system
10 sender
11 signal generator
20 receiver
21 signal decoder
30 dielectric waveguide
31 dielectric
32 metal-plating layer
33 protective layer
40, 50 connector apparatus
100 first communication apparatus
111 oscillator
112, 212 multiplier
113, 211, 213 buffer
200 second communication apparatus
300 sheet-like dielectric material

What is claimed is:
1. A waveguide, comprising:
a dielectric including two surfaces, an electric field intersecting with the two surfaces;
metal-plating layers coating the two surfaces of the dielectric, the electric field intersecting with the two surfaces; and
a protective layer coating a periphery of the dielectric including the two surfaces coated with the metal-plating layers, wherein
the protective layer includes a sheet-like conductor wound up around the dielectric including the two surfaces coated with the metal-plating layers.

2. The waveguide according to claim 1, wherein
the sheet-like conductor is a metal tape.

3. The waveguide according to claim 2, wherein
the metal-plating layers and the metal tape are made of the same metal material.

4. The waveguide according to claim 2, wherein
the metal-plating layers are made of a metal material having a conductivity higher than a conductivity of the metal tape.

5. The waveguide according to claim 1, wherein
a cross-sectional shape of the dielectric perpendicular to a waveguide direction is a rectangle, and two surfaces including longer sides of the cross section are the two surfaces, the electric field intersecting with the two surfaces.

6. The waveguide according to claim 5, wherein
the rectangular cross-section of the dielectric has arc-shaped corners.

7. The waveguide according to claim 5, wherein
the dielectric has two arc-shaped surfaces including shorter sides of the rectangular cross-section.

8. The waveguide according to claim 1, wherein
a cross-sectional shape of the dielectric perpendicular to a waveguide direction is an elliptical shape, and two surfaces of the cross-section having a larger curvature are the two surfaces, the electric field intersecting with the two surfaces.

9. The waveguide according to claim 1, wherein
the waveguide is configured to transmit a high-frequency signal.

10. The waveguide according to claim 9, wherein
the high-frequency signal is a millimeter-waveband signal.

11. A waveguide manufacturing method, comprising:
a step of metal-plating layers coating two surfaces of a dielectric, an electric field intersecting with the two surfaces; and
a step of winding up a protective layer made of a sheet-like conductor around the dielectric including the two surfaces coated with the metal-plating layers to thereby coat a periphery of the dielectric including the two metal-plated surfaces with the protective layer, in this order.

12. The waveguide manufacturing method according to claim 11, wherein
the dielectric has a sheet-like shape, and
the step of metal-plating includes metal-plating both surfaces of the sheet-like dielectric.

13. The waveguide manufacturing method according to claim 12, further comprising:
the step of cutting the sheet-like dielectric having both the metal-plated surfaces into strips each having a predetermined width.

14. The waveguide manufacturing method according to claim 13, wherein
the step of coating with the protective layer includes winding up a sheet-like conductor around the dielectric, the dielectric being metal-plated and cut in a strip.

15. The waveguide manufacturing method according to claim 14, wherein
the sheet-like conductor is a metal tape.

16. A wireless transmission system, comprising:
a sender configured to send a high-frequency signal;
a receiver configured to receive the high-frequency signal; and
a waveguide configured to transmit the high-frequency signal between the sender and the receiver, wherein
the waveguide includes
a dielectric including two surfaces, an electric field intersecting with the two surfaces,
metal-plating layers coating the two surfaces of the dielectric, the electric field intersecting with the two surfaces, and
a protective layer coating a periphery of the dielectric including the two surfaces coated with the metal-plating layers, and
the protective layer includes a sheet-like conductor wound up around the dielectric including the two surfaces coated with the metal-plating layers.

17. The wireless transmission system according to claim 16, wherein
the high-frequency signal is a millimeter-waveband signal.

* * * * *